United States Patent [19]
Leigers et al.

[11] Patent Number: 5,953,891
[45] Date of Patent: Sep. 21, 1999

[54] CLEANING METHOD OF SUGARCANE HARVESTER, AND SUGARCANE HARVESTER OPERATING ACCORDING TO IT

[75] Inventors: Günter Leigers, Harsewinkel; Frank Gröger, Lotte; Hillrich Otten, Harsewinkel, all of Germany

[73] Assignee: Claas KGaA, Harsewinkel, Germany

[21] Appl. No.: 08/912,559

[22] Filed: Aug. 18, 1997

[30] Foreign Application Priority Data

Aug. 16, 1996 [DE] Germany ............... 196 32 938

[51] Int. Cl.⁶ .................................................. A01F 12/48
[52] U.S. Cl. .................. 56/16.6; 56/16.4 D; 56/DIG. 2; 460/99
[58] Field of Search ................... 56/53, 52, 60, 56/504, 194, 1, 16.4 D, DIG. 1, DIG. 2, DIG. 17, 16.6; 460/99, 100

[56] References Cited

U.S. PATENT DOCUMENTS

| | | |
|---|---|---|
| 3,103,091 | 9/1963 | Duncan et al. . |
| 4,070,809 | 1/1978 | Soulat . |
| 5,069,024 | 12/1991 | Pinto . |

FOREIGN PATENT DOCUMENTS

| | | |
|---|---|---|
| 29 35 983 A1 | 4/1981 | Germany . |
| 3334968A1 | 3/1984 | Germany . |
| 31 15 924 C2 | 5/1989 | Germany . |
| 34 29 204 C2 | 1/1993 | Germany . |
| 3429204C2 | 1/1993 | Germany . |

OTHER PUBLICATIONS

"Die mechanisierung der Zuckerrohrernte in der Republik Kuba", by Leon, N., In: Agrartechnik, 27 Jg., Heft 10, Oct. 1977, pp. 455–458, Fig. 5,7.

*Primary Examiner*—Terry Lee Melius
*Attorney, Agent, or Firm*—Michael J. Striker

[57] ABSTRACT

For cleaning a sugarcane harvester, a main blower is provided in a lower region of a cleaning chamber and has a vertical blowing out pipe, the blowing out pipe of the main blower faces both chopper rollers of a comminuting device, and a deviating blower is located above the chopper rollers for deviating a main cleaning air stream exiting the vertical blowing out pipe by substantially 90° to direct the same to a discharge hood.

30 Claims, 5 Drawing Sheets

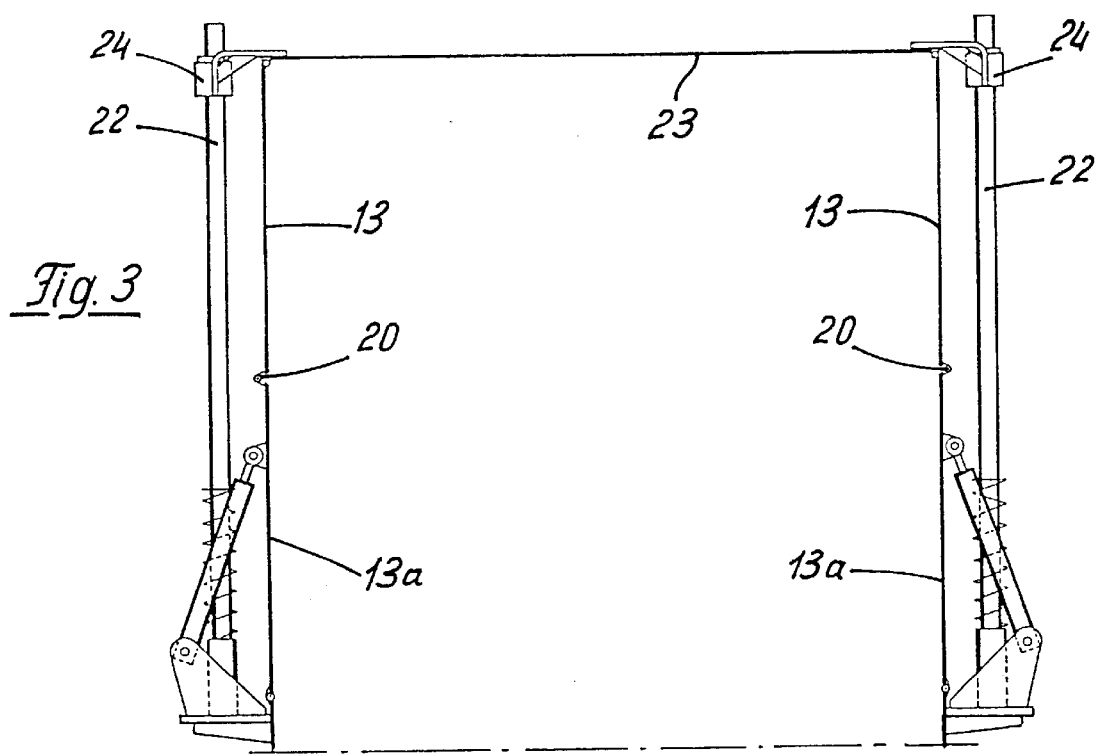
_Fig. 3_
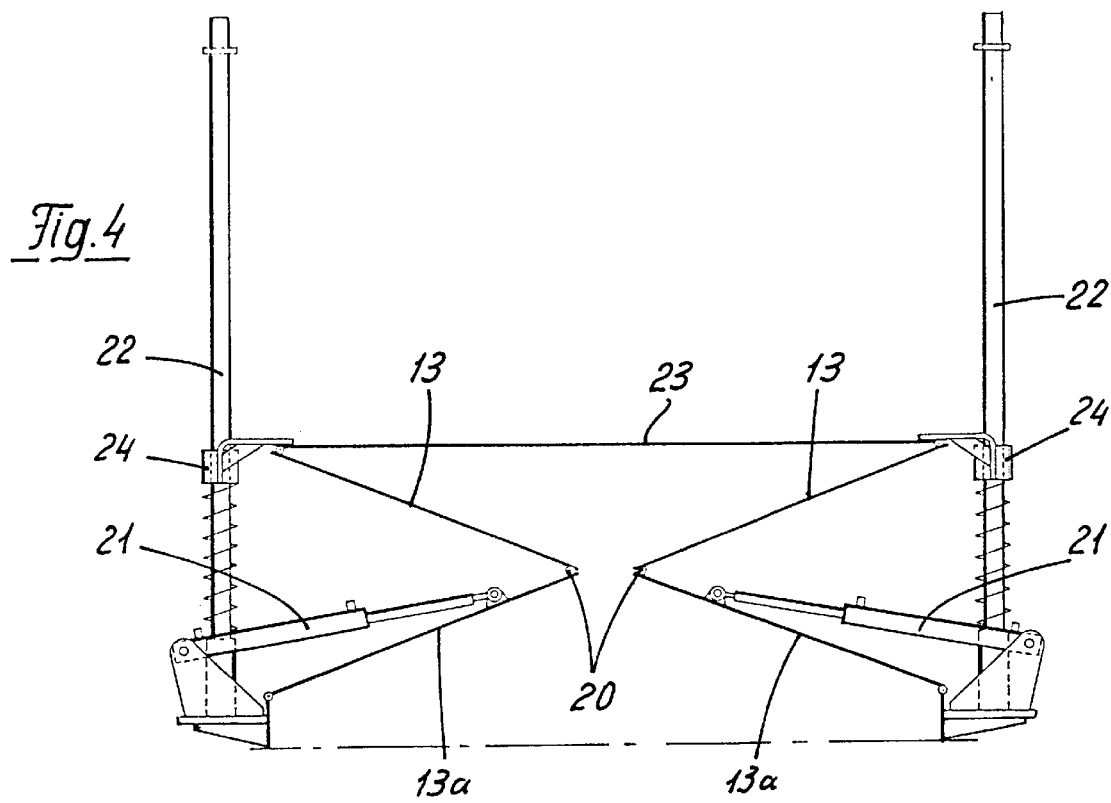
_Fig. 4_

CLEANING METHOD OF SUGARCANE HARVESTER, AND SUGARCANE HARVESTER OPERATING ACCORDING TO IT

BACKGROUND OF THE INVENTION

The present invention relates to a cleaning method of a sugarcane harvester in which with, a main blower is usually arranged in a lower region of the sugarcane harvester an inclined and upwardly directed cleaning air stream oriented to a discharge hood is produced, and second deviating blower deviates an air stream so that the foreign parts to be separated are guided through the discharge hood.

The present invention also deals with a sugarcane harvester, in particular performing the inventive method, which is provided with rotor dividers, a cutter disk device, an inclined conveyor, a comminuting device for the stalks, a discharge conveyor, a discharge hood and a cleaning chamber with a main blower and a deviating blower for producing and guiding a cleaning air stream. It has been conventional to inflame the field before harvesting of the sugarcane to burn the leaves and tips. The subsequent harvesting is performed either by hand or by a correspondingly designed sugarcane harvester. The comminuted stalks are identified as billets. For separating the foreign particles from the billets in the residues of the leaves and tips, the sugarcane harvesters are provided with two blowers. For this purpose, axial and radial blowers are utilized, and both blowers have the same construction or a combination is used. By means of the axial blower it is possible to provide a suction pull. However, the disadvantage of it is that also the billets can be sucked in. The axial blower is provided exclusively for sucking out the foreign particles with the air stream and supplying the same to the discharge hood. Such a harvester is disclosed for example in the German patent document DE 34 29 204 C2 and DE 33 34 968 A1. A main blower mounted in the lower part of this sugarcane harvester is a radial blower. The blowing out pipes of the main blower are inclined in direction of the subsequently discharge hood. Because of their greater weight, the billets fall on the discharge conveyor, while the foreign particles are taken by the air stream or aspirated by the air stream of the axial blower and fall through the opening of the discharge hood onto the field.

The above described harvesters have been substantially proven in the practice. However, it is expected that in the near future stricter environmental laws will be accepted which will forbid worldwide flaming before the harvesting, so that only so called "green sugarcane" can be harvested, whereby the fraction of the foreign particles to be separated relative to the sugarcane itself will extremely increase. Therefore with the obtained power of a sugarcane harvester of the known type will lead to poor cleaning output. The reason is that the cleaning spaces or cleaning chambers are too small and the time for the separation of the increased quantity of the foreign particles is too low. Moreover, no axial blower can be utilized any longer because it should be taken into consideration that, the billets are aspirated and shattered more intense, and therefore the losses are too high. Furthermore, the harvested product correspondingly is guided through a disproportionally narrow structural space in an extremely short time.

SUMMARY OF THE INVENTION

Accordingly, it is an object of the present invention to provide a method of cleaning of a sugarcane harvester, and a sugarcane harvester operating according to it, which are such that during harvesting of unflamed, green sugarcane, despite the increase throughput quantity, an optimal separation of billets formed by comminution of the sugarcane stalks from the foreign particles can be obtained with maintaining the productivity of the known machines.

In accordance with the inventive method, a main blower produces a first air stream which extends so that it raises substantially from below upwardly, and a further air stream produced by a deviating blower which is associated functionally with the first air stream turns the first air stream in direction toward the discharge hood, so that both air streams are oriented to the discharge hood.

In accordance with the inventive method of cleaning, several air streams can be utilized. The first air cleaning stream passes directly after the discharge from the blowing out pipe directly behind the comminuting device arranged forwardly in the machine, whereby a substantial separating and cleaning effect is obtained. The second cleaning air stream which is also branched by the main blower but further behind in the machine can be considered as a post cleaning, since the cleaning air stream is oriented to the preliminarily cleaned billets. In accordance with this principle, also further air streams can be supplied from the main blower, however even two air streams provide a substantial improvement in the cleaning results when compared with the prior art. In order to prevent overloading of the main blower by the additional cleaning air streams, an additional main blower can be associated with each cleaning air stream. The cleaning process is performed therefore in three stages.

For conversion of this cleaning process, a sufficiently dimensioned cleaning chamber is needed, whose volume must be, for example, double the volume used in known methods for sugarcane harvesters. Thereby a sufficient time for the separation of the foreign part is provided. The important effect is connected with the fact that by the first cleaning air stream in connection with the second or further cleaning air streams, the harvested product to be cleaned is held longer in suspense, whereby the separation of the foreign particles is improved. Further, a pneumatic transporting effect is obtained, so that in some cases mechanical transporting elements can be dispensed with. Moreover, the transporting speed is increased. The both air streams act also so that the lighter foreign particles formed substantially by the leaves are displaced upwardly and downwardly. The main cleaning air stream of the main blower, with respect to the flow direction of the harvested product must be located forwardly, to supply the energy required for transportation of the foreign parts.

A simple, structural, reliable converting solution is provided when the main separating air stream and the cleaning air stream are produced by a single blower, for example by a single radial blower which has two blowing out pipes. The main cleaning air stream is supplied from below upwardly and the cleaning air stream is oriented to the discharge hood, for which purpose the central longitudinal axes of the blowing out pipes in the further extensions include an acute angle. The central longitudinal axes can intersect inside or outside the contour of the radial blower. In order to adapt the air stream to the alternating conditions, such as for example different product quantities, leave fractions, etc., it is provided that the air quantities and/or speeds of the blower per time unit are changeable. Moreover the flow directions of the cleaning and deviating air streams supplied from the blowing out pipes of the blower are changeable within a predetermined angular region. Thereby also the flow speed can be influenced, so that it is increased with the reducing cross-section of the blowing out pipe.

The corresponding objectives of the present invention with respect to the sugarcane harvester are achieved when the main blower has at least two blowing out pipes, so that one of the blowing pipes directs a cleaning air stream to the discharge hood at the side facing away from the comminuting device, while the second blowing out pipe is arranged at the side facing the comminuting device vertically or substantially vertically for the main cleaning air stream, so that its flow direction extends from below upwardly and substantially vertically, while in the upper region of the cleaning chamber a deviating blower is arranged so that the main cleaning air stream is guided in direction toward the discharge hood. The advantages provided by this machine are substantially the same as the advantages of the inventive method. The special advantage structurally resides in the fact that the main cleaning air stream and the cleaning air stream are produced by a single blower. Alternatively, it is however possible to use a corresponding blower separately for the cleaning air stream and for the main cleaning air stream. The cleaning action of the main air stream is especially efficient since the flow direction of the chopped sugarcane is either transverse to the flow direction of the main cleaning air stream or is inclined at a small acute angle relative to the vertical line.

For optimal control of the wind speed and the distribution of the harvested product stream, the rotors of the blower are coupled with a regulatable drives for optimal adjustment of the rotary speed or for regulation during the operation. Moreover, the controllable guiding flaps can be turnably supported in the blowing out pipes of the blower for influencing the flow speed and the flow direction. For preventing losses of the comminuting device and stabilizing the main cleaning air stream exiting the vertical blowing out pipe, a roller with a smooth peripheral surface can be rotatingly drivingly supported between the comminuting device and the vertical blowing out pipe. The rotary direction must counteract the air stream of the main blower. Since the comminuting device normally includes a chopper roller pair, a gap is formed between the smooth roller and the chopper roller located substantially at the same height. In order to ensure that only small chopped product falls through, a sealing element is arranged between the comminuting device and the transporting roller and extends over the width of the comminuting device.

In order to guarantee a reliable drawing-in of the cut sugarcane, the inclined conveyor is composed of several roller pairs arranged one behind the other and rotatably supported between the comminuting device and the cutter disk device. Thereby the cut stalks are reliably engaged and drawn in, so that the risks of clogging can be excluded. For reliably supplying the billets after the passage of the main cleaning air stream to the discharge conveyor, an elevator is mounted above the main blower between the vertical blowing out pipe of the main blower and the discharge conveyor. This elevator can be however dispensed with when the kinetic energy of the billets is sufficient for reaching the discharge conveyor.

As mentioned above, the volume of the cleaning chamber in the inventive sugarcane harvester is substantially double the volume of the conventional machines. Thereby during a street travel, the structural height of the harvester must be reduced. For this purpose, the walls which laterally limit the cleaning chamber in the upper region are composed of two foldable wall halves whose adjoining edges are connected with one another by hinges. During non-use the both wall halves are brought to a small possible distance from one another so as to flatly abut against one another. For facilitating this process to the driver, a cylinder-piston unit is pivotably connected to each lower wall half, while the upper edges are fixed on sliding shoes which are displaceable on vertical guiding rods. By the local reduction of the structural height of the cleaning chamber, a free space is provided. This space is used for introducing at least partially the region of the discharge conveyor which projects laterally opposite to the sugarcane harvester. The discharge conveyor is composed of several individual conveyors which are turnable about the axes extending transversely to the transporting device.

For preventing blowing of the acceptable chopped product, even in relatively small quantities, through the discharge hood to the field, the outlet cross-section of the discharge hood is changeable by an adjustable slider in correspondence with the alternating conditions in the state of the harvested product. The slider is displaceable from the lower wall of the discharge hood upwardly. Because the adjustability of the discharge cross-section, the pressure inside the region of the machine located before the discharge hood is increased. The throughflow speed through the discharge hood is thereby reduced. The billets carried by the cleaning air streams are no longer thrown through the discharge hood onto the field, but instead a movement path is provided because of the pressure wind conditions adapted by the slider, so that the billets are reliably lowered onto the discharge conveyor and transported by the conveyor to an accompanying vehicle. The adjustability of the slider can be obtained by hand or by means of an adjusting drive. In order to reliably supply the caught billets to the discharge conveyor, the slider is located at an acute angle to the discharge conveyor.

The roller associated with the vertical blowing out pipe of the main blower provides stabilization of the neighboring air stream. For further stabilization of the air and mixture stream exiting the chopper device, the upper roller of the comminuting device is associated with the subsequently located movable limiting surface, whose movement direction is oriented to the main cleaning air stream. This movable limiting surface prevents an uncontrolled and whirling flow during the passage to the discharge hood of the plant parts which exit the comminuting device and are carried along. This movable limiting surface can be formed in different ways. However, it is advantageous when it is formed as at least one rotatably driven rotor or as a rotatable band which is guided on one or several rollers. The movement direction of the roller or the band is oriented to the vertical main cleaning air stream at the side facing the main blower. In accordance with another embodiment, the movable limiting surface is located in a central region between the vertical blowing out pipe of the main blower and the deviating blower.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing an upper region of a cleaning chamber of the inventive sugarcane harvester thresher in an operating position;

FIG. 4 is a view showing an upper region of the cleaning chamber of the inventive sugarcane harvester in a lowered position;

DESCRIPTION OF PREFERRED EMBODIMENTS

Figure 1:
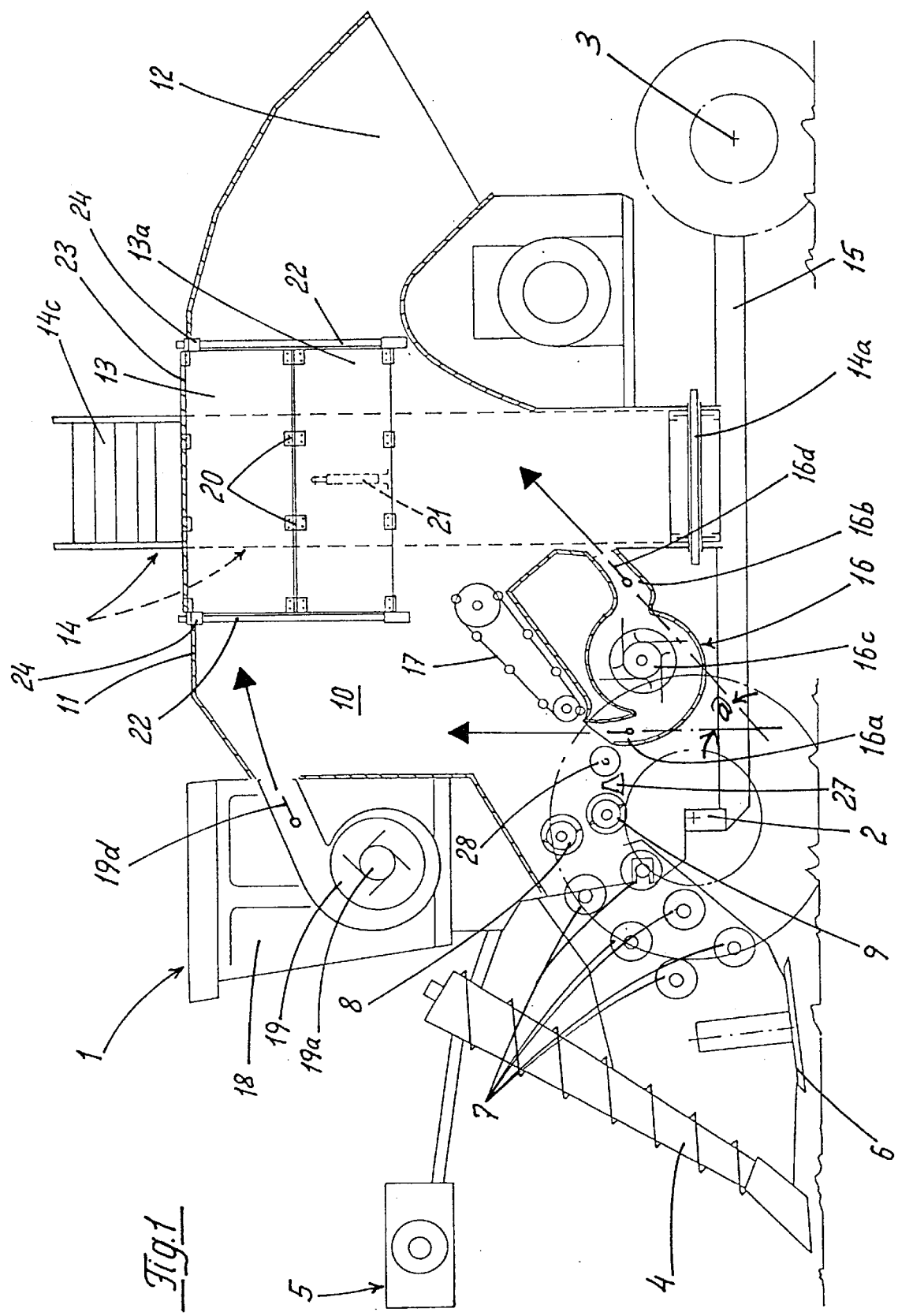
FIG. 1 is a view showing a method in accordance with the present invention and a side view of a sugarcane harvester operating in accordance with the inventive method.
Figure 2:
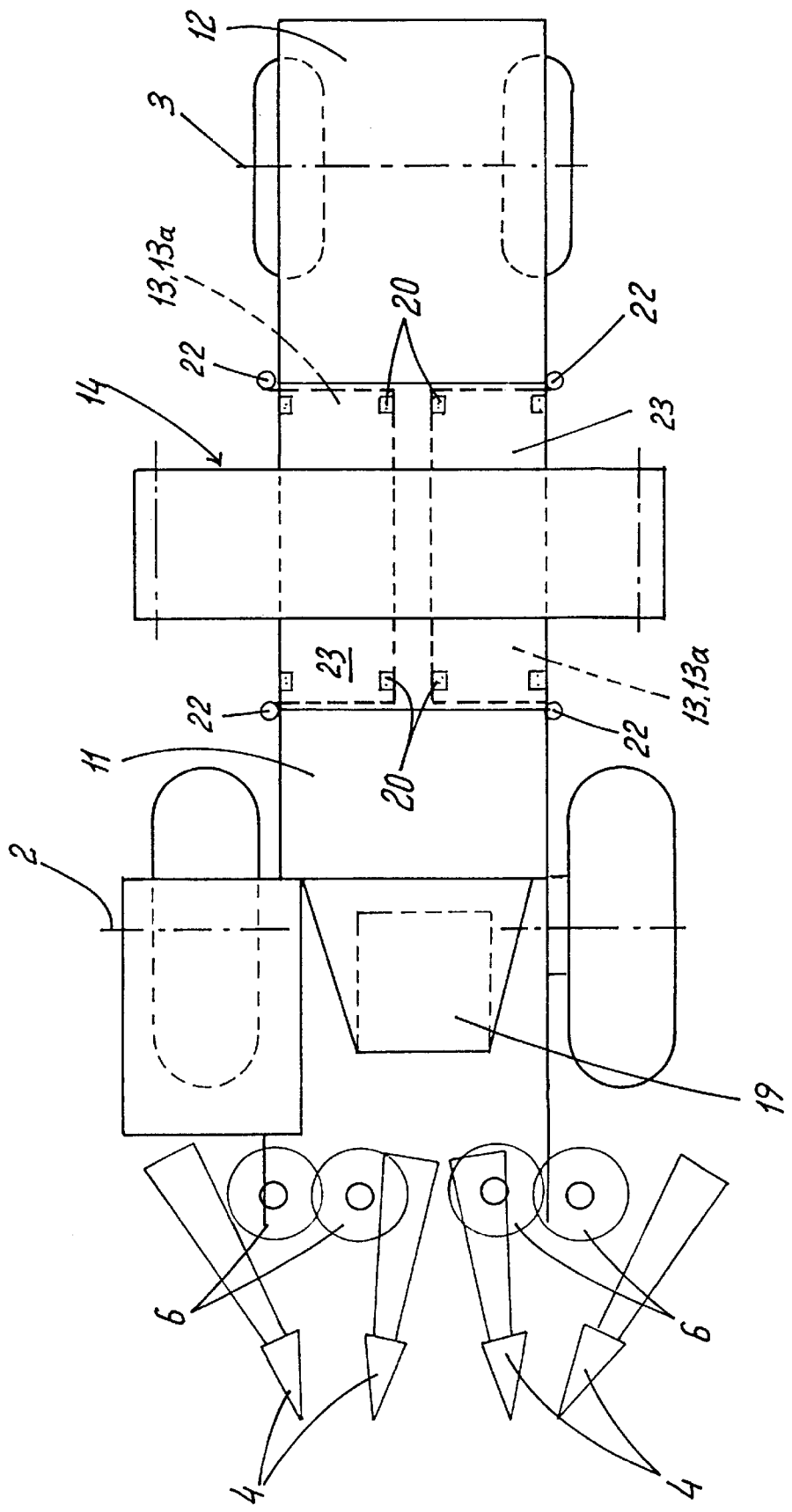
FIG. 2 is a plan view of the construction illustrated in FIG. 1.

FIG. 1 shows a self-propelling sugarcane harvester 1 which in accordance with FIG. 2 and formed for harvesting of two rows of sugarcane. It contains a front driving axle 2 and rear steering axle 3, as well as from rotor dividers 4. For separation of the tips the sugarcane harvester 1 is provided also with a tip cutting mechanism 5 which is not shown in detail. For cutting off the stalks at the bottom the sugarcane harvester is provided with a cutter disk device which is composed of circular cutter disks 6 arranged in a rotatably driving manner and grouped in pairs. An inclined conveyor follows the cutter disks 6. In the shown embodiment it is composed of three roller pairs 7 which are arranged one behind the other. The comminuting device follows the roller pairs 7. It is composed of two rotatably driveable chopping rollers 8 and 9 provided with corresponding chopping cutters.

A cleaning chamber 10 is formed between the driving axle 2 and the steering axial 3. It is limited by a roof 1 from above and also by lateral walls. The lateral walls are composed locally of two wall halves 13 and 13a as shown in FIGS. 3 and 4. A discharge conveyor 14 is located above the cleaning chamber 10. It is formed as a multi-part conveyor band which is loaded laterally and extends so as to raise. An inclined discharge hood 12 with an opening facing the ground follows the cleaning chamber 10.

A base frame 15 of the sugarcane harvester 1 is located substantially at the height of the steering axle 3. A main blower 16 is located between the driving axle 2 and a discharge conveyor 14 directly over the base frame 15. It extends over the total width of the sugarcane harvester 1. The main blower at a side facing the chopper rollers 8, 9 is provided with a vertically upwardly oriented blowing out pipe 16a, and at the side facing the discharge conveyor 14 is provided with a second blowing out pipe 16b which extends inclinedly to the discharge hood 12. A rotor 16c of the main blower 16 is driven in a not shown manner in a clockwise direction.

The vertical blowing out pipe 16a produces a main cleaning air stream which is supplied from below upwardly and flows substantially vertically as identified with the arrow. The chopped product stream passes through the main cleaning air stream. A transverse flow process is performed here in a transverse direction. The cleaning air stream exiting the blowing out nozzle 16b extends substantially at an angle of 40° to the discharge conveyor 14. The billets formed by chopping of the sugarcane stalks are thrown on the discharge conveyor 14 by the elevator 17 which is guided over two deviating rollers. Therefore, the cleaning air stream performs correspondingly a post cleaning. This cleaning air stream is supplied then to the discharge hood 12. When the transporting stream composed of the billets has a sufficient kinetic energy, the elevator 17 can be dispensed with.

The sugarcane harvester 1 is provided with a driver's cabin 18. It is laterally offset relative to the longitudinal axis of the machine and located approximately above the driving axle 2. A cleaning chamber 10 follows the cabin 18. A deviating blower 19 is located before the cleaning chamber 10 at the height of the cabin 18. It is provided for the main cleaning air stream exiting the blowing out nozzle 16a. A rotor 19a is also driven a clockwise direction. Thereby the main cleaning air stream is deviated substantially by 90° and supplied over the discharge conveyor 14, so that the third cleaning stage is positively formed. The main cleaning air stream flows in the discharge hood 12. The blowing out pipes 16a and 16b of the main blower 16d are provided each with a controlled flap 16b, while its adjusting drive is not shown. Also, the blowing out pipe of the deviating blower 19 is provided with a control flap 19d for influencing the flow speeds and the exit directions.

A smooth-surface roller 28 is rotatably supported between the vertical blowing out pipe 16a of the main blower 16 and the lower chopping roller 9. Its rotary direction is opposite to the air stream of the rotor 16c of the main blower 16 for stabilization of the main cleaning air stream and for reduction or prevention of the losses by the chopping rollers 18 and 19. A stationary wedge-shaped sealing element 27 is mounted between the lower chopping roller 9 and the roller 28 so that no chopped product can pass through the gap.

The walls which laterally limit the cleaning chamber 10 are provided, in the upper region at each side, with two wall halves 13 and 13a which are articulately connected with one another by hinges 20. The length of the wall halves 13, 13a is substantially a double the width of the discharge conveyor 14. The both vertical end edges are located at the same offset to the longitudinal edges of the discharge conveyor 14. A movement unit 21 is articulately connected to each lower wall half 13a at an outer side. Guiding rods 22 are associated with the vertical end edges of the wall halves 13, 13a at the outer side on the housing. A roof 23 and the associated upper edges of the upper wall halves 13 are connected with sliding members 24 which are displaceably arranged on the guiding rods 22. As shown in FIG. 4, by extending the piston rods of the movement units 21, the wall halves 13, 13a can be folded and the roof is lowered. A free space is provided between the four guiding rods 22.

Figure 5:
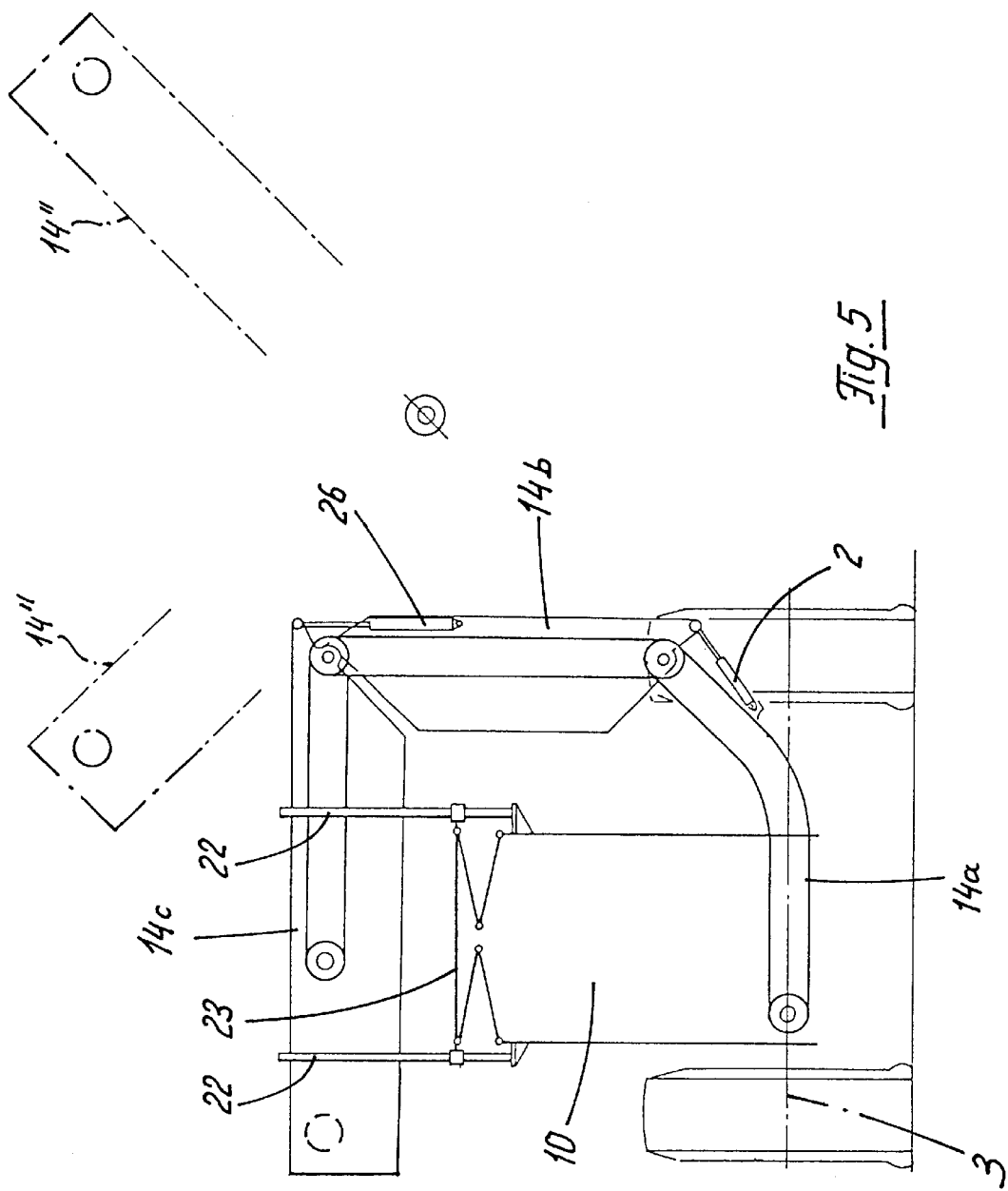
FIG. 5 is a view showing a schematic cross-section transversely to a traveling direction with a folded position of a discharge conveyor of the inventor harvester.

FIG. 5 shows that during a street travel the outer ends of the discharge conveyor 14 are turned at least partially into the free space located between the guiding rods 22. For this purpose, the discharge conveyor 14 is composed of partial pieces 14a which are always located inside the sugarcane harvester, a central partial piece 14b, and an outer partial piece 14c. In the retracted position the central partial piece 14b extends vertically and is located inside the contour of the sugarcane harvester 1. The end-side partial piece 14c extends substantially horizontally in the above mentioned free space. The central partial piece 14b and the end-side partial piece 14c can be extended and retracted by the cylinder-piston units 25 and 26. The retracted position is shown in FIG. 5 in full lines, while the extended position during use of the sugarcane harvester 1 is identified with dash-dot lines. This position of the discharge conveyor 14 is identified with the reference numeral 14'. An intermediate position during the retraction is identified with reference numeral 14".

Figure 6:
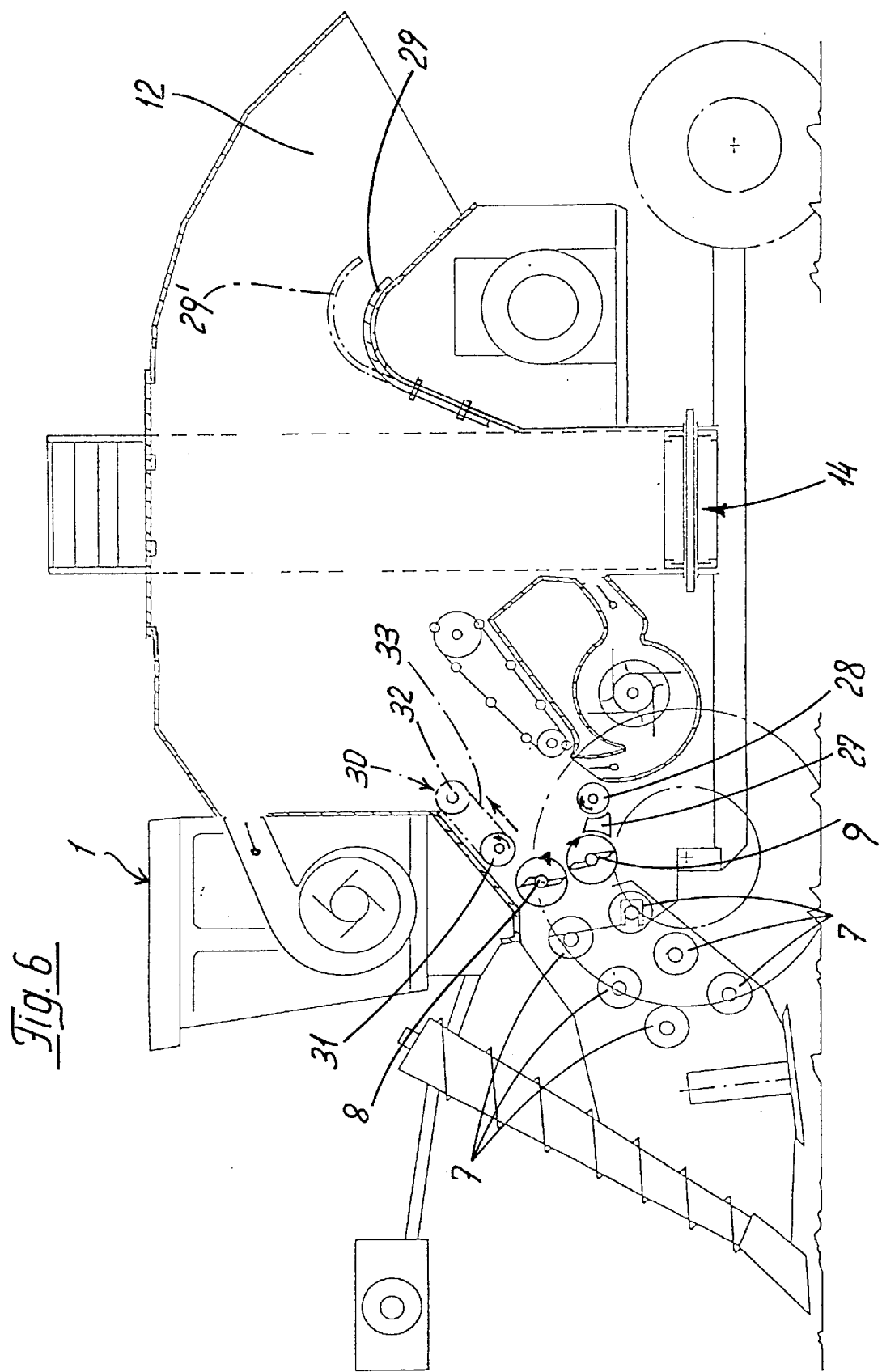
FIG. 6 is a view illustrating a method in accordance with the present invention and a sugarcane harvester which uses the inventive method in accordance with a second embodiment of the invention, in a side view.

FIG. 6 shows a further embodiment of the sugarcane harvester 1. A first difference is that the outlet cross-section of the discharge hood 12 is changeable by an adjustable slider 29. The slider 29 displaces upwardly the lower wall of the discharge hood 12. In the shown embodiment the slider 29 is formed as a sheet metal profile. It is displaced from the lower position to an upper position 29' identified in dash-dot lines. The displacement can be performed manually or by an adjusting drive. Thereby different requirements in the harvested product condition can be taken into consideration. A pressure increase is produced in the space before the discharge hood 12 when the outlet cross-section of the discharge hood 12 is reduced, while the flow speed inside the discharge hood 12 is reduced. The harvested product without the slider 29 would be thrown to the lower region onto the field, while now its strikes against the slider 29 and is deviated in direction toward the inclined conveyor 14. As can be seen from FIG. 6, the slider 29 encloses an acute angle with the discharge conveyor 14.

As described above, the roller 28 associated with the vertical blowing out pipe 16a of the main blower 16 is provided for stabilization of the adjacent main cleaning air stream. For further stabilization of the stream exiting the comminuting device and formed by the entrained plant parts which are uncontrolled and real transversely to the space formed as a passage, a movable limiting surface 30 is located after the upper chopper roller 8 of the comminuting device. Its effective movement direction is oriented toward the main cleaning air stream. This movable limiting surface is located substantially in the central region between the vertical blowing out pipe 16a of the main blower 16 and the deviating blower 19. The movable limiting surface is composed in the shown embodiment of a band 13 which is guided by two deviating rollers 31, 32. The running direction of the run of the band 33 which faces the main blower 16 is identified with an arrow.

In contrast to the shown embodiment, the movable limiting surface 30 can be composed of one or several rollers which must be driven so that the movement speed component of the region which faces the main blower 16 extends in direction of the arrow. As a result, the rotary direction in accordance with the illustration of FIG. 6 must be opposite to the clockwise direction.

It will be understood that each of the elements described above, or two or more together, may also find a useful application in other types of methods and constructions differing from the types described above.

While the invention has been illustrated and described as embodied in method of cleaning sugarcane harvester, and sugarcane harvester with cleaning means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A cleaning method of a sugarcane harvester provided with sugarcane harvesting means, comprising the steps of producing a first main cleaning air stream which raises substantially from below upwardly and is formed by a main blower; and producing a second air stream by a deviating blower and directing the second air stream toward the main cleaning air stream so as to turn the main cleaning air stream in direction toward a discharge hood by the second air stream, so that both air streams are oriented toward the discharge hood.

2. A method as defined in claim 1; and further comprising the step of producing a further cleaning air stream; and using a single main blower provided with two blowing out pipes for producing both the main cleaning air stream and the further cleaning air stream.

3. A method as defined in claim 2, wherein said using step includes using a radial blower as the single main blower.

4. A method as defined in claim 1; and further comprising the step of producing a further cleaning air stream by a further main blower.

5. A method as defined in claim 1; and further comprising the step of arranging central longitudinal axes of blowing out nozzles of the main blower and the deviating blower so that their extensions form an acute angle.

6. A method as defined in claim 1; and further comprising the step of adjusting air quantities of the main blower and the deviating blower per time unit.

7. A method as defined claim 1; and further comprising the step of adjusting air speeds of the main blower and the deviating blower per time unit.

8. A method as defined in claim 1; and further comprising the step of adjusting air quantities and air speeds of the main blower and the deviating blower per time unit.

9. A method as defined in claim 1; and further comprising the step of change flow directions of the first main cleaning air stream and the second air stream which exit blowing out nozzles of the main blower and the deviating blower within a predetermined angular region.

10. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which is directed toward the first main cleaning air stream and thereby turns the first air stream in direction toward said discharge hood, so that the both air streams are directed toward said discharge hood.

11. A sugarcane harvester as defined in claim 10, wherein each of said blowers has a rotor, said rotors of said main blower and said deviating blower being provided with regulatable drives.

12. A sugarcane harvester as defined in claim 10, wherein said main blower and said deviating blower have blowing out pipes provided with controllable guiding flaps which are turnably supported for influencing a flow speed and a flow direction.

13. A sugarcane harvester as defined in claim 10; and further comprising a comminuting device; a cutter disk device; and an inclined conveyor which is composed of a plurality of roller pairs arranged one behind the other and rotatably supported between said comminuting device and said cutter disk device.

14. A sugarcane harvester as defined in claim 10; and further comprising a discharge conveyor which is composed of a plurality of individual conveyors; and movement units which turn said individual conveyors about axes locating transversely to a transporting direction.

15. A sugarcane harvester as defined in claim 10; and further comprising an adjustable slider which changes an outlet cross-section of said discharge hood, said discharge hood having upper and lower walls, while said slider is displaceable from said lower wall toward said upper wall of said discharge hood.

16. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which turns the first air stream in direction toward said discharge hood, so that the both air streams are directed toward said discharge hood; and a sugarcane communicating device; and a rotatable air stream stabilizing roller provided with a smooth surface, said main blower having a vertical blowing out pipe, said roller being located between said communicating device and said vertical blowing out pipe of said main blower.

17. A sugarcane harvester as defined in claim 16, wherein said roller has a rotary direction which is opposite to said main cleaning air stream of said main blower at said blowing out pipe.

18. A sugarcane harvester as defined in claim 16, wherein said comminuting device has a chopper roller; and further comprising a sealing element located between said chopper roller of said comminuting device and said roller with said smooth peripheral surface.

19. A sugarcane harvester as defined in claim 16; and further comprising a movement unit articulately connected with lower ones of said wall halves; sliding shoes which engage upper edges of said wall halves and are displaceable on vertical guiding bars; and a roof mounted on said guiding bars.

20. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which turns the first air stream in direction toward said discharge hood, so that the both air streams are directed toward said discharge hood, said main blower having a vertical blowing out pipe; a discharge conveyor; and an elevator provided for elevating billets formed from sugarcane and arranged between said vertical blowing out pipe of said main blower and said discharge conveyor above said main blower.

21. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which turns the first air stream in direction toward said discharge hood, so that the both air streams are directed toward said discharge hood; means forming a cleaning chamber and including walls which laterally limit said cleaning chamber, said walls being provided in an upper region with two foldable wall halves; and a hinge articulately connecting adjacent edges of said wall halves with one another.

22. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which turns the first air stream in direction toward said discharge hood, so that the both air streams are directed toward said discharge hood; an adjustable slider which changes an outlet cross-section of said discharge hood, said discharge hood having upper and lower walls, while said slider is displaceable from said lower wall toward said upper wall of said discharge hood; and a discharge conveyor, said slider being arranged at an acute angle relative to said discharge conveyor.

23. A sugarcane harvester, comprising sugarcane harvesting means; a discharge hood for discharging harvested sugarcane; and cleaning means including a main blower producing a first main cleaning air stream which raises substantially from below upwardly, and a deviating blower producing a second air stream which turns the first air stream in direction toward said discharge hood, so that the both air streams are directed toward said discharge hood; a communicating device having an upper chopper roller; and a movable limiting surface which is arranged after said upper chopper roller and oriented toward a movement direction of the main cleaning air stream.

24. A sugarcane harvester as defined in claim 23, wherein said movable limiting surface is formed by at least two rotatably driven rollers.

25. A sugarcane harvester as defined in claim 23, wherein said movable limiting surface is formed by a band which is guided over at least one roller.

26. A sugarcane harvester as defined in claim 23, wherein said main blower and said deviating blower have vertical blowing out pipes, said movable limiting surface being located in a central region between said vertical blowing out pipes of said main blower and said deviating blower.

27. A cleaning method of a sugarcane harvester provided with sugarcane harvesting means, comprising the steps of producing a main cleaning air stream and subdividing the main cleaning air stream into a first main cleaning air stream which raises substantially from below upwardly and another main cleaning air stream which is inclined by main blowing means; directing a second air stream by deviating blowing means toward said first main cleaning air stream so as to deviate said first main cleaning air stream in direction toward a discharge hood so that both said first and second air streams are oriented toward the discharge hood.

28. A method as defined in claim 27, wherein said producing the main cleaning air stream and subdividing the main cleaning air stream into the first main cleaning air stream and another main cleaning air stream includes producing and subdividing by a single main blower.

29. A sugarcane harvester, comprising sugarcane harvesting means; a discharge hood for discharging harvested sugarcane; and cleaning means including main blowing means producing a main cleaning air stream separated into a first main cleaning air stream which raises substantially from below upwardly and another main cleaning air stream which is inclined, and deviating blowing means producing a second air stream which is directed toward the first main cleaning air stream and thereby turns the first main cleaning air stream in direction toward said discharge hood, so that both air streams are directed toward said discharge hood.

30. A sugarcane harvester as defined in claim 29, wherein said main blowing means include a single blower which produces both the first main cleaning air stream and the other main cleaning air stream.

* * * * *